United States Patent [19]
Mansell

[11] Patent Number: 5,533,074
[45] Date of Patent: Jul. 2, 1996

[54] NUCLEAR REACTOR COOLANT LEVEL MONITORING SYSTEM

[76] Inventor: Timothy E. Mansell, 1480 Wire Rd., Aiken, S.C. 29801

[21] Appl. No.: 432,985

[22] Filed: May 2, 1995

[51] Int. Cl.⁶ ................................................. G21C 17/035
[52] U.S. Cl. ............................................... 376/258; 73/299
[58] Field of Search ............................. 376/245, 258, 376/259, 260; 73/290 R, 291, 299

[56] References Cited

U.S. PATENT DOCUMENTS

| | | | |
|---|---|---|---|
| 2,791,906 | 5/1957 | Vetter | 73/299 |
| 3,250,123 | 5/1966 | Clayton | 73/301 |
| 3,371,534 | 3/1968 | Akeley | 73/299 |
| 4,394,346 | 7/1983 | Morooka | 376/258 |
| 4,414,177 | 11/1983 | Tokarz | 376/247 |
| 4,567,761 | 2/1986 | Fajeau | 73/290 R |
| 4,765,945 | 8/1988 | Walleser | 376/258 |

FOREIGN PATENT DOCUMENTS

| | | | |
|---|---|---|---|
| 0086314 | 7/1981 | Japan . | |
| 0133613 | 10/1981 | Japan . | |
| 0137114 | 10/1981 | Japan . | |
| 0154617 | 11/1981 | Japan . | |
| 0050619 | 3/1982 | Japan | 73/299 |
| 9104593 | 6/1984 | Japan | 376/258 |
| 0137823 | 8/1984 | Japan . | |
| 0203994 | 11/1984 | Japan | 376/258 |
| 0100091 | 6/1985 | Japan | 376/258 |
| 1384390 | 2/1975 | United Kingdom | 73/299 |

OTHER PUBLICATIONS

Marl Von G. Strohrmann, Losungen von MSR-Aufgaben, Apr./1975; Regelungstechnische Praxis.

E. Gakis H. Schwerdtner, Hydrostatic level measurement of boiling water in pressure vessels, Jun./1976, pp. 229-233, BWK—Brebbstoff Warme-Kraft.

*Primary Examiner*—Daniel D. Wasil
*Attorney, Agent, or Firm*—Michael A. Mann

[57] ABSTRACT

A system for determining the level of coolant in a depressurized nuclear reactor comprises a first set of pressure transducers located in the coolant piping and a second set of pressure tranducers located at the top or near the top of the pressurizer. Electrical signals from these independent transducers are fed by cable to a controller with a microprocessor in the reactor control room where the coolant level is calculated and displayed. Compensations for signal error, coolant temperature and coolant chemistry are provided.

22 Claims, 2 Drawing Sheets

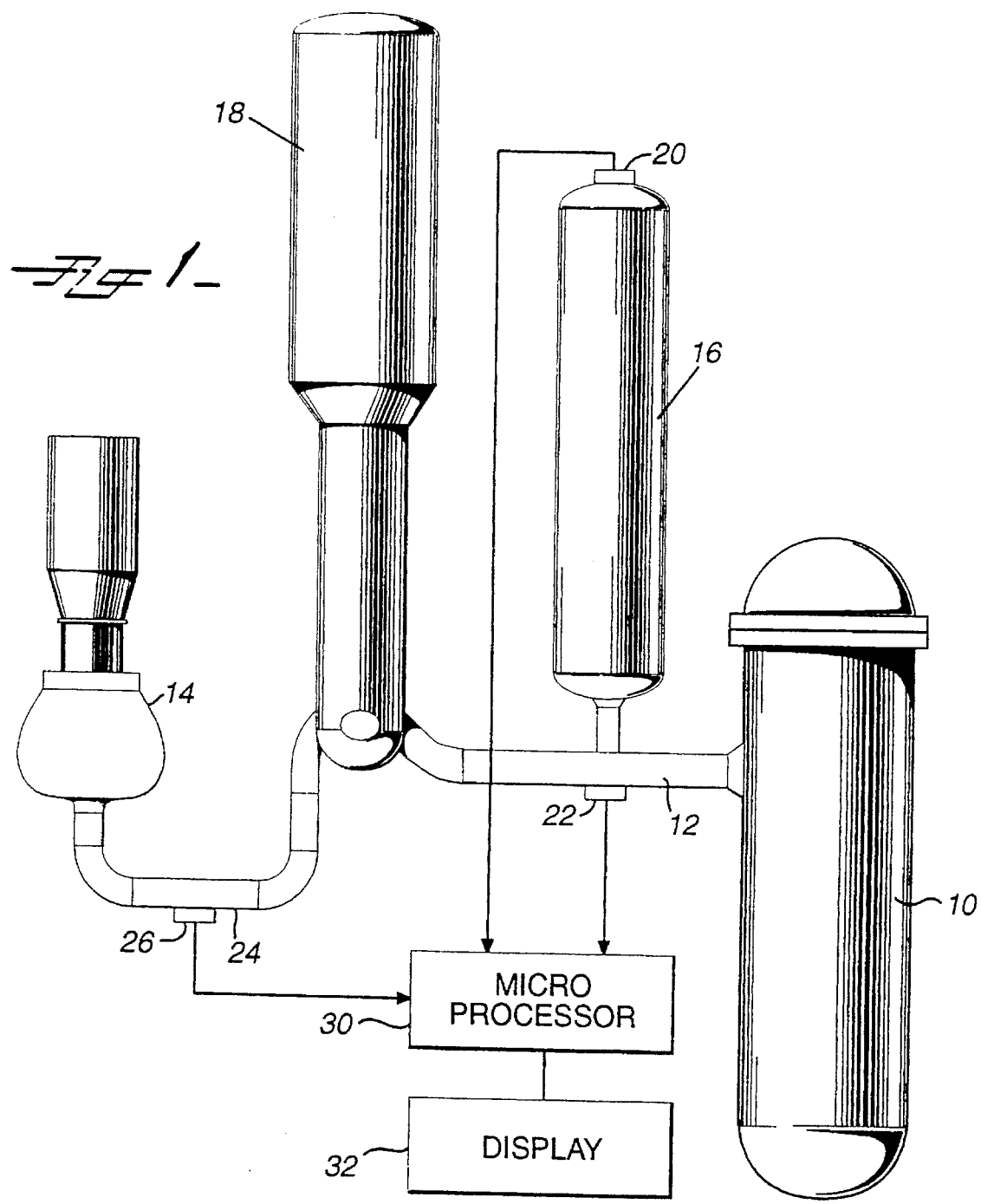

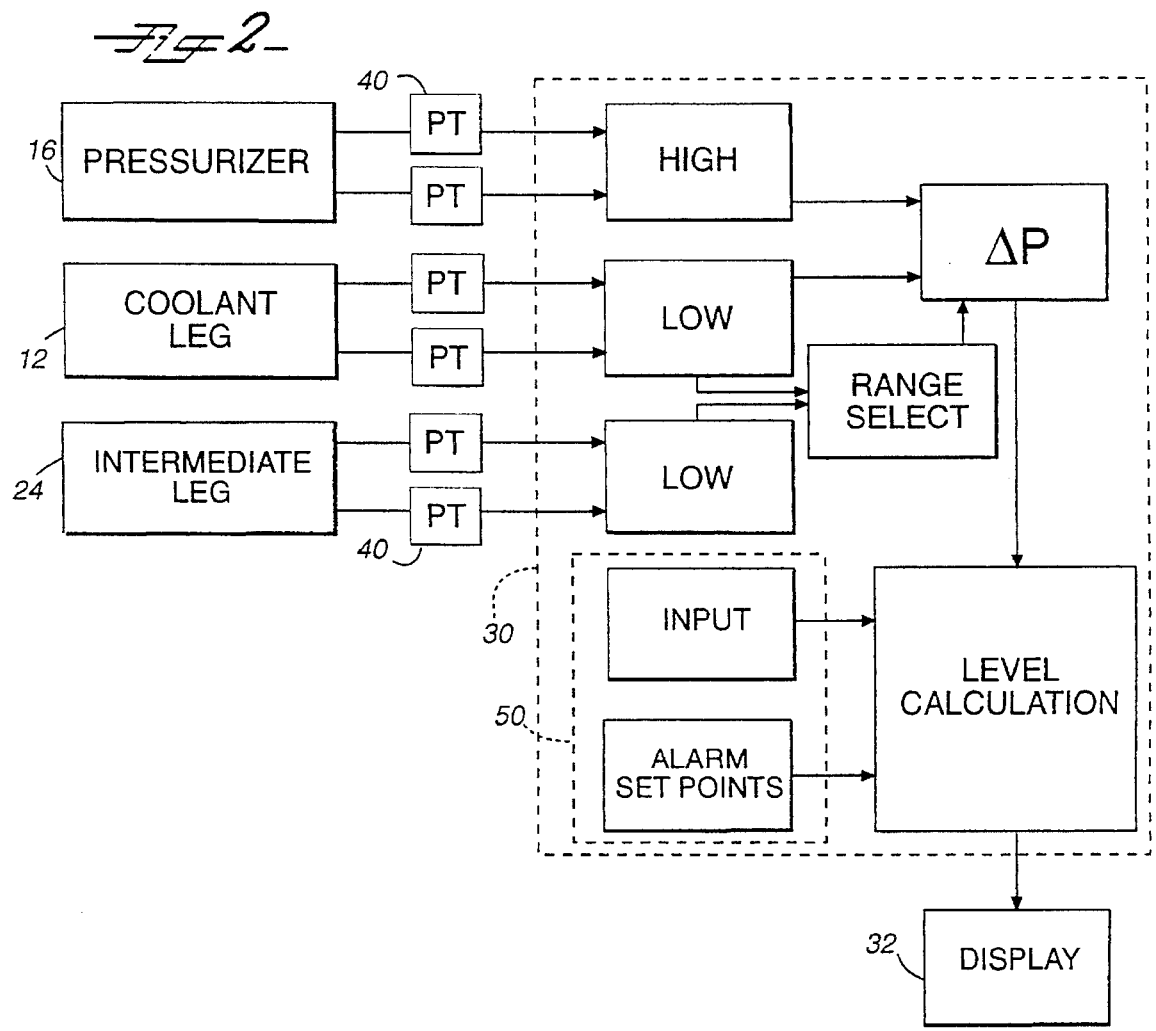

NUCLEAR REACTOR COOLANT LEVEL MONITORING SYSTEM

BACKGROUND OF THE INVENTION

1. Field of the Invention

The present invention relates generally to measurement and monitoring of the coolant level in nuclear power reactors when the reactor is depressurized, such as during an outage for maintenance, inspection and refueling of the reactor.

2. Discussion of Background

Commercial, nuclear power reactors use water for three distinct purposes: for heat transfer, for neutron moderation to facilitate fission, and for radiation shielding. During reactor operation, the water, acting as a heat transfer medium, or "coolant," captures the energy generated by the fissioning of nuclear fuel as heat. In its role as a neutron moderator, the water molecules slow down the high energy neutrons released in a fission event so that they are more likely to cause a next fission event in a sequence of fission events, which sequence is the so-called chain reaction that enables the reactor to continue to produce power.

Water shields workers from radiation from "spent" or used nuclear fuel stored at reactors in "pools" and from radiation emanating from fuel in the core when the part of the core is being replaced during a refueling outage.

Reactors are generally pressurized during operation so that, at reactor temperatures, the coolant remains liquid, or at least partly liquid. Some reactors, called pressurized water reactors (PWRs), operate at pressures sufficiently high so that the coolant remains a liquid and does not turn to steam. Upon leaving the pressure vessel, the heated coolant is conducted to a heat exchanger where it transfers the heat it absorbed from the fuel to a second water system at lower pressure. The water in the secondary water system flashes to steam for use in driving stream turbines.

Other reactors, called boiling water reactors (BWRs), operate at somewhat lower pressures than PWRs so that two phase flow—water and steam—occurs directly in the reactor vessel. The steam is extracted from the pressure vessel and conducted from there to turbines. In both kinds of reactors, the coolant is circulated using coolant pumps and is kept at operating elevated pressure using pressurizers.

During a reactor refueling outage, the reactor pressure vessel is depressurized and the reactor head is removed for access to the core of nuclear fuel and vessel internal components and structures. Fuel in the core is replaced and maintenance and inspections of the reactor system can be performed during this time. Although the coolant level is lowered, the nuclear core in the pressure vessel is kept covered with coolant to remove "decay heat." Nuclear fuel, even after the chain reaction has been stopped, still generates and radiates considerable heat from the radioactive decay of the fission fragments locked inside the fuel elements. This decay heat must be removed by having a residual heat removal system circulate water through the core continuously. The coolant, in addition to being needed to absorb and remove this decay heat, also acts as a shield by attenuating radiation given off by the radioactive fuel, so that those engaged in refueling operations or otherwise near the core for inspection and maintenance are exposed to much less radiation than they would otherwise be were the core not covered with coolant, and, for that matter, covered to a depth that is high enough so that the residual heat removal system pump does not lose suction. Therefore, both for attenuating radiation and for decay heat removal, maintaining the level of coolant above the core during refueling is vital.

To maintain and monitor the coolant level in unpressurized power reactors, tubes of narrow diameter are typically used to conduct a small portion of the coolant to another location in the reactor containment, removed from the pressurizer and coolant loops. The coolant tubes are connected to the coolant loop piping at several locations and to the instrumentation connection located on the pressurizer. At this remote location, a portion of the coolant tubing is replaced with clear tubing so that the level of coolant in the tubes can be visually inspected. The coolant level in this "sight tube" corresponds to the actual level in the reactor system. At some reactors, a differential pressure device connected between two points in the coolant system produces an electrical signal related to the coolant level. The signal is proportional to the difference in the pressure at the "wet" and "dry" sides. In addition to sight tubes and differential pressure transducers, ultrasonic level sensors are used in the coolant loops when the coolant level falls below the top of the coolant loop pipe.

However, these systems are inherently inaccurate and can cause serious conditions to occur. Part of the inherent inaccuracy results from the differences in the relative size of the coolant piping compared to the instrument tubing. Also, if air intrudes into the "wet" side or water intrudes into the "dry" side of a differential pressure system, or if the dry side is exposed to a positive or negative pressure, such as when an air evacuation system is connected to the pressurizer or when the coolant level is increased, the levels indicated by these systems will be false.

Ultrasonic systems are also inaccurate, especially for higher draining rates where advance warning would be crucial, and they can confuse water droplets on the piping walls with the water level.

Furthermore, there is a lag in time from when the coolant level changes and the time when that change appears in a sight tube because of the low driving head between the level indication system and the coolant system. When the system is being drained, a lag in the change of the level means that the sight tube will give a false high signal; when the system is being refilled, it will give a false low signal. Both false signals are unconservative; that is, the error is potentially harmful and not simply an error that does no harm or one where the actual level of the coolant is safer than indicated. A false high signal can result in loss of residual heat cooling; a false low signal can result in spilling of coolant, which can result in contamination of equipment and personnel. Consequently, changes need to be made in small, slow increments so that the level detector has time to register the new coolant level before any further changes can be made. If too great a change is made, the realization of true level may not occur until shutdown cooling has been lost. Loss of shutdown core cooling has serious safety implications, yet there have been two hundred reported events since 1980 regarding failure of the maintenance drain down level indicating systems and a resulting loss of residual heat removal. These events have occurred because of discrepancies between the actual coolant level and the level shown by the level-indicating system.

Because of the consequence of errors in measuring liquid levels, the rate of level change is limited by utility operating procedures. This self-imposed requirement for slow level change carries with it a cost to the utility operating the nuclear power plant. Lowering and raising the liquid level are done at the beginning and at the end of the outage, both critical path events: their duration adds directly to the length of the outage. While the outage takes place, the utility may have to buy replacement power, typically at a cost of $500,000 to $750,000 per day, approximately $20,000 to $30,000 per hour.

Consequently, there remains a need for an accurate, rapid coolant level measuring and monitoring system for nuclear power reactors.

SUMMARY OF THE INVENTION

According to its major aspects and briefly stated, the present invention is a system for determining coolant level in a nuclear reactor that is accurate and fast. It is based on receipt of two or more independent pressure indications from pressure transducer sets, one or more located in the coolant piping and one located at the top of the pressurizer. The signals generated by these two transducer sets are input into a programmed microprocessor that calculates and displays the level corresponding to the pressures sensed.

The present invention is a more accurate, much faster system for determining liquid level. As such, it promotes reactor safety and reduces outage time and cost. It reduces radiation exposure of workers because the need to enter the radioactive environment of the containment building to obtain local readings from the sight tube described in the Discussion of Background, above, is eliminated; the levels are displayed in the reactor control room where operators control the residual heat removal system pumps and valves. Therefore, they are in a position to receive the information about the level of coolant where they can control it.

An important feature of the present invention is the use of two independent pressure sensor sets rather than a differential pressure sensor. By using two independent sensor sets, the pressure sensed by one is not affected by the pressure of the other, as in current reactor coolant level indicator designs. The independence of signals results in greater accuracy. A system according to the present invention is accurate to within 0.01 inches at fill rates in excess of one foot per second, compared to discrepancies of as much as 1.5 feet or more when fill rates exceeded 0.2 feet per second with the conventional system.

Another important feature of the present invention is the use of electrical signals rather than a pressure wave conveyed through a long, thin tube to convey pressure information. Electrical signals do not have the time lag associated with pressure waves in external coolant tubing, and therefore the change in level indication occurs essentially as it happens.

Yet another feature of the present invention is the location of the display in the reactor control room where operators can monitor coolant level and take appropriate action to change levels when necessary, without the need to enter the reactor containment to check a sight tube.

A group of features of the present invention related to signal accuracy is the use of redundant pressure tranducers in each sensor set, signal quality checking, and an "auctioneering" logic system to select the lower wet signal and higher dry signal. This group of features provides a safety factor that improves the reliability of the level calculation and slightly underestimates coolant level when all transducers are functioning and provides a backup signal in the event one fails.

Other features and advantages of the present invention will be apparent to those skilled in the art of reactor coolant level indications from a careful reading of the Detailed Description of Preferred Embodiments accompanied by the following drawings.

BRIEF DESCRIPTION OF THE DRAWINGS

In the drawings:

FIG. 1 is a schematic of a system for monitoring and measuring the coolant level in a nuclear power reactor according to a preferred embodiment of the present invention; and FIG. 2 is a detail of the system as shown in FIG. 1, showing the control of the signals feeding into the level indicator.

DETAILED DESCRIPTION OF PREFERRED EMBODIMENTS

The present invention is a system for determining the level of the coolant in a nuclear reactor when that reactor is depressurized. The "level" of the coolant means the relative location of the top surface of the coolant with respect to a fixed, preselected point. Depressurized means, in this context, that the higher, operating pressure has been relieved so that the reactor pressure vessel can be opened to the atmosphere inside the reactor containment. The coolant may still be under a pressure other than atmospheric pressure (14.7 psi), but the pressure in the depressurized vessel is the same as that in the reactor containment.

"Determining" is essentially the process of calculating a level based on pressure readings. Therefore, the actual level—or depth—of the coolant is not measured directly but is inferred by making a calculation using an algorithm based on pressure data and other information that correlates the pressure of the coolant at specific locations to its level.

The fact that pressure and depth or level are related is well established. For example, barometric pressure is given in units of inches, corresponding to the height ("level") of a column of mercury; the weight of the column, which is directly proportional to its level, is also proportional to the pressure it exerts. Levels of coolant in a reactor are somewhat more complicated. The weight of the coolant is a function of its temperature (as is the internal volume of the coolant piping) and its chemical make up, since the coolant will not be pure water but is likely to be a weak solution of boric acid, usually given in pans per million (ppm). Both temperature and boron concentration are factors that affect the coolant density. Temperature will also affect the geometry of the coolant piping, which can cause the level of coolant in the piping to change.

The actual coolant level will be referred to simply as the "coolant level;" the level that is determined from pressure transmitter data will be referred to as the "calculated level" or sometimes the "determined level." Both levels are given with respect to a stationary reference point that is arbitrarily chosen. For example, the level can be stated in terms of inches or feet above the top of the core or from the lowest point in the system.

The term "loop" refers to a closed system of components and piping that are all in fluid communication. In a typical nuclear reactor system (see FIG. 1), there is one pressure vessel 10 containing the nuclear core, which is a collection of fuel elements, and one or more coolant loops 12 that conduct coolant to and from the pressure vessel. Each loop has its own pump 14 and the coolant system has a pressurizer 16. Each loop of a PWR will have a heat exchanger 18 included in the loop. Each loop of a BWR will be connected to a steam turbine (not shown) rather than a heat exchanger.

One set of sensors 22 is placed in a lower location, below the lowest expected level of coolant, preferably a location in the coolant loop 12 but preferably not in a part of the coolant loop piping where air can be trapped. The other set of sensors 20 is placed at a location higher than the highest expected coolant level, preferably at the top of pressurizer 16 or in the piping leading directly into it and as close as possible to pressurizer 16. Because the inside of the pressurizer 16 (and piping leading into it) communicates with the reactor coolant piping 12, the difference in pressure between these two points must be due to the coolant. This first sensor system 20 is referred to as the "dry" side of the level detection system.

The second set of sensors 22, also preferably electronic pressure transmitters, are installed in coolant loop 12. The part of the coolant loop 12 leading to the reactor vessel 10 is called the "cold" leg and the part leading from the reactor vessel 10 is called the "hot" leg. Transmitters can be installed at various locations in either or both legs. There is also an intermediate leg 24 between the heat exchanger and the reactor coolant pump. Although pressure transmitters can also be connected to intermediate leg 24, inaccuracies in the pressure sensed in the intermediate leg can be caused by restricted flow from the steam generator tubes and the pump adaptor casing, so positioning sensors in this leg is not preferred.

Preferably, each set of sensors comprises a plurality of electronic pressure transducers 40 (see FIG. 2) selected for durability, reliability and sensitivity range under reactor conditions. Plural transducers provide assurance that, if any one or more tranducers 40 are or become defective, the remaining transducer or transducers will continue to provide level indicating signals. Each transducer 40 is preferably mounted using a threaded or tubing type seal as is well known in the art of process instrumentation. The dry side transducers 40 are preferably selected for sensitivity in the range of pressures from about 30 inches of mercury vacuum to about 15 PSIG. The wet side tranducers 40 are preferably selected for sensitivity in the range of pressures from about 30 inches of mercury vacuum to about 50 PSIG.

Each pressure transducer 40 issues an electrical signal carried by cable to a control area, such as the reactor control room, where the signal is fed into a controller that includes a microprocessor 30 and a display 32 (FIG. 1).

The electrical signals from each transmitter can be monitored at intervals by a multiplexer or monitored continuously. If monitored at intervals, four to ten times per second is preferred in order to measure coolant levels in essentially real time. Signals are checked for quality. A signal meeting a quality check is an accurate signal. If a signal is not within an expected range, or if the difference between two transducers of a transducer pair or between the transducers of one pair and a second pair located in a different part of coolant loop 12 is too great, the signal may not be a quality signal. Suitable alarms can be given to alert the operator that there is a signal from one transducer that is more than a preselected amount (2%, for example) different from a corresponding transducer of a pair of transducers, is inconsistent with expectations, or is obviously erroneous. Any signal that does not meet these threshold quality checks is disregarded, and the signals of other transducers 40 are used instead.

Preferably, of each pair of transducers 40 at each location where the signal differs by more than a small amount, such as one percent, the more conservative signal is selected, as shown in FIG. 2, as long as the signals do not differ by more than a small amount (to pass a quality check), such as two percent or less. For example, from the first set of sensors 20, located at pressurizer 16, the more conservative signal would be that corresponding to the higher pressure, and from the second set of sensors 22, located in coolant loop 12, the more conservative signal would be that corresponding to the lower pressure. The combination of these two selections would produce a calculated coolant level that would, if at all, err on the low side. If the actual level differs from the calculated level, the former would tend to be somewhat higher.

If a pair of transducers 40 is placed in intermediate leg 24 rather than or in addition to other locations in coolant leg 12, the lower of their two signals is selected because they would also be wet side sensors. Often, intermediate leg 24 is physically lower than the remainder of the coolant loop, as illustrated in FIG. 1; therefore, depending on the range of coolant level, signals from sensor 22 or signals from a sensor 26 in intermediate leg 24 would be selected by microprocessor 30. For example, if the coolant level were low enough, the intermediate leg sensors would be used because there may be no coolant in the balance of coolant loop 12. Otherwise, coolant loop sensors 22 would be used and are preferred.

The selected high and low signals are then used to calculate the differential pressure which is then converted to a calculated coolant level. The calculation includes factors for compensating for coolant temperature and chemistry (boron concentration), which affect coolant density and piping geometry.

As an example of an algorithm for calculating coolant level from pressure readings from pressure tranducers plus temperature and boron concentration data, the following formula can be used:

$$\text{Level (ft)} = \{[K_1 + (T_w - 80)(K_2) + (K_3 C_B)](P_2 - P_1)\} + E_{p2}$$

where $K_1$ equals 2.314512, the ft/PSI conversion for pure water at 80° F.;

$K_2$ equals 0.0062784, the ft/PSI-°F. conversion factor for any temperature between 80° F. and 180° F.;

$K_3$ equals $6.944 \times 10^{-9}$, the ft/PSI-ppm correction factor for any boron concentration;

$T_w$ is the temperature of the water in ° F. input by the operator (in the range 80° F. to 180° F.);

$C_B$ is the boron concentration in ppm input by the operator;

$E_{p2}$ is the actual elevation in feet where the instrument $P_2$ is located;

$P_1$ is the pressure (PSI) at the high point (dry side); and $P_2$ is the pressure (PSI) at the low point (wet side).

The operator will be able to input various measurement points (the identification of wet side transducers), water temperatures, boron concentrations, alarm setpoints, and units of measurements of the microprocessor through an interface device 50. Microprocessor 30 will be designed to verify signal quality and to display 32 the calculated coolant level digitally or in graphical form to the operator. When the operator is not actively operating interface device 50, it will provide warnings and displays using light emitting diodes (LEDs) or liquid crystal displays (LCDs).

The alarms included in the system comprise high and low level alarms, temperature and boron concentration update alarms that are connected to a timer, instrument quality alarms, and alarms that warn the operator that the level is below the elevation of an instrument tap.

It will be apparent to those skilled in the art that many modifications and substitutions may be made to the foregoing preferred embodiments without departing from the spirit and scope of the present invention. For example, fiber optic signals could be used instead of or in addition to electrical signals from the pressure tranducers, and a variety of different displays of the coolant level could be employed. However, the scope of the invention is defined by the appended claims.

What is claimed is:

1. An apparatus for determining a level of coolant in a nuclear reactor system, said nuclear reactor system having a pressurizer and a coolant loop, said coolant having a temperature and a density, said apparatus comprising:

first sensor means for sensing pressure in said pressurizer, said first sensor means issuing a first signal related to said pressure sensed in said pressurizer;

second sensor means for sensing pressure in said coolant loop, said second sensor means issuing a second signal related to said pressure in said coolant loop; and controller means responsive to said first and said second sensor means for calculating said level of said coolant of said nuclear reactor from said first and said second signals.

2. The apparatus as recited in claim 1, wherein said first and said second sensor means are pressure transmitters.

3. The apparatus as recited in claim 1, wherein said first and said second sensor means are pressure transducers, and said first and second signals are electrical signals.

4. The apparatus as recited in claim 1, wherein said first and said second sensor means each comprise a plurality of pressure transmitters.

5. The apparatus as recited in claim 1, further comprising means in electrical connection with said controller means for visually displaying a signal corresponding to said level calculated by said controller means.

6. The apparatus as recited in claim 1, wherein said controller means, in calculating said level, compensates for said temperature of said coolant.

7. The apparatus as recited in claim 1, wherein said controller means, in calculating said level, compensates for said density of said coolant.

8. An apparatus for determining a level of coolant in a nuclear reactor system, said nuclear reactor system having a pressurizer and a coolant loop, said coolant having a temperature and a density, said apparatus comprising:

first pressure transmitter means for sensing pressure in said pressurizer and issuing a first signal related to said pressure sensed in said pressurizer;

second pressure transmitter means for sensing pressure in said coolant loop, said second sensor means issuing a second signal related to said pressure in said coolant loop;

controller means responsive to said first and said second sensor means for calculating said level and a rate of change of said coolant of said nuclear reactor from said first and said second signals.

9. The system as recited in claim 8, wherein said controller compensates for temperature and density of said coolant in calculating said level.

10. The system as recited in claim 8, wherein said first and said second sensor means each comprises a plurality of pressure transmitters.

11. The system as recited in claim 8, wherein said first and said second sensor means each comprises a plurality of pressure transmitters, and said controller selects a high signal from among said plurality of pressure transmitters of said first sensor means and a low signal from among said plurality of pressure transmitters of said second sensor means.

12. The system as recited in claim 8, wherein said second sensor means further comprises a plurality of pressure transmitters pairs, each pair of said plurality of pairs being located in a different part of said coolant loop.

13. The system as recited in claim 8, wherein said first sensor means operates in a range of pressures from about 30 inches of mercury vacuum to about 15 PSIG.

14. The system as recited in claim 8, wherein said second sensor means operates in a range of pressures from about 30 inches of mercury vacuum to about 50 PSIG.

15. An apparatus for determining a level of coolant in a nuclear reactor system, said nuclear reactor system having an upper location and a lower location, said upper location being above an uppermost expected level of said coolant, said lower location being below a lowermost expected level of said coolant, said coolant having a temperature and a density, said apparatus comprising:

first pressure transmitter means for sensing pressure in said upper location and issuing a first signal related to said pressure sensed in said upper location;

second pressure transmitter means for sensing pressure in said lower location, said second sensor means issuing a second signal related to said pressure in said lower location; and controller means responsive to said first and said second sensor means for calculating said level of said coolant of said nuclear reactor from said first and said second signals.

16. The system as recited in claim 15, wherein said controller compensates for temperature and density of said coolant in calculating said level.

17. The system as recited in claim 15, wherein said first and said second sensor means each comprises a plurality of pressure transmitters.

18. The system as recited in claim 15, wherein said first and said second sensor means each comprises a plurality of pressure transmitters and said controller selects a high signal from among said plurality of pressure transmitters of said first sensor means and a low signal from among said plurality of pressure transmitters of said second sensor means.

19. The system as recited in claim 15, wherein said second sensor means further comprises a plurality of pressure transmitters pairs, each pair of said plurality of pairs being located in said lower level.

20. The system as recited in claim 15, wherein said first sensor means operates in a range of pressures from about 30 inches of mercury vacuum to about 15 PSIG, and said second sensor means operates in a range of pressures from about 30 inches of mercury vacuum to about 50 PSIG.

21. A method for determining the level of coolant in a nuclear reactor system, said nuclear reactor system having a pressurizer and a coolant loop in fluid communication with said pressurizer, said method comprising the steps of:

generating a first signal related to the pressure in said pressurizer;

generating a second signal related to the pressure in said coolant loop;

calculating the level of said coolant from the difference in said first and said second signals.

22. The method as recited in claim 21, further comprising the step of compensating said difference for temperature of and boron concentration in said coolant.

* * * * *